United States Patent
Johnson

(10) Patent No.: US 6,728,671 B1
(45) Date of Patent: Apr. 27, 2004

(54) AUTOMATIC SPEECH RECOGNITION CALLER INPUT RATE CONTROL

(75) Inventor: Mark Alan Johnson, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/537,330

(22) Filed: Mar. 29, 2000

(51) Int. Cl.[7] .............................................. G10L 15/00
(52) U.S. Cl. ................. 704/231; 379/88.01; 379/88.02; 379/88.03; 379/88.04
(58) Field of Search ........................... 379/88.01, 88.02, 379/88.03, 88.04, 88.16, 88.17, 265.01, 265.02, 265.09, 265.07, 266.01; 704/231

(56) References Cited

U.S. PATENT DOCUMENTS

| | | | | |
|---|---|---|---|---|
| 4,914,692 A | * | 4/1990 | Hartwell | 379/406.03 |
| 5,283,788 A | * | 2/1994 | Morita | 370/236 |
| 5,537,395 A | * | 7/1996 | Alles | 370/236 |
| 5,758,318 A | * | 5/1998 | Kojima | 704/251 |
| 5,970,446 A | * | 10/1999 | Goldberg | 704/233 |

FOREIGN PATENT DOCUMENTS

| | | | | |
|---|---|---|---|---|
| EP | 0539105 A2 | * | 10/1992 | H04Q/11/04 |
| GB | 2325110 A | * | 11/1998 | |

* cited by examiner

Primary Examiner—Richemond Dorvil
Assistant Examiner—Kinari Patel

(57) ABSTRACT

An apparatus, method and system provide for caller input rate control for automatic speech recognition (ASR) components within interactive communication systems. The various embodiments provide a concentrator functionality to increase the capacity of ASR systems, and provide a delay functionality to continue to provide service to callers during congestion or overload conditions. The delay functionality provides various associated delay modes, including the insertion of silent periods within messages or prompts played to a caller, and providing increased message duration. The preferred method embodiment determines a usage level of a plurality of ASR input channels, and when the usage level is greater than a first predetermined threshold, provides an associated delay mode for a message output on an output channel of the plurality of output channels. The additional concentrator functionality in the preferred method includes monitoring an energy level of a caller input channel, storing in a memory buffer all received input from that input channel for a preceding period of time, and when the monitored energy level is greater than a predetermined energy level, transmitting the buffered information to an ASR input channel and connecting the caller input channel to the ASR input channel.

51 Claims, 5 Drawing Sheets

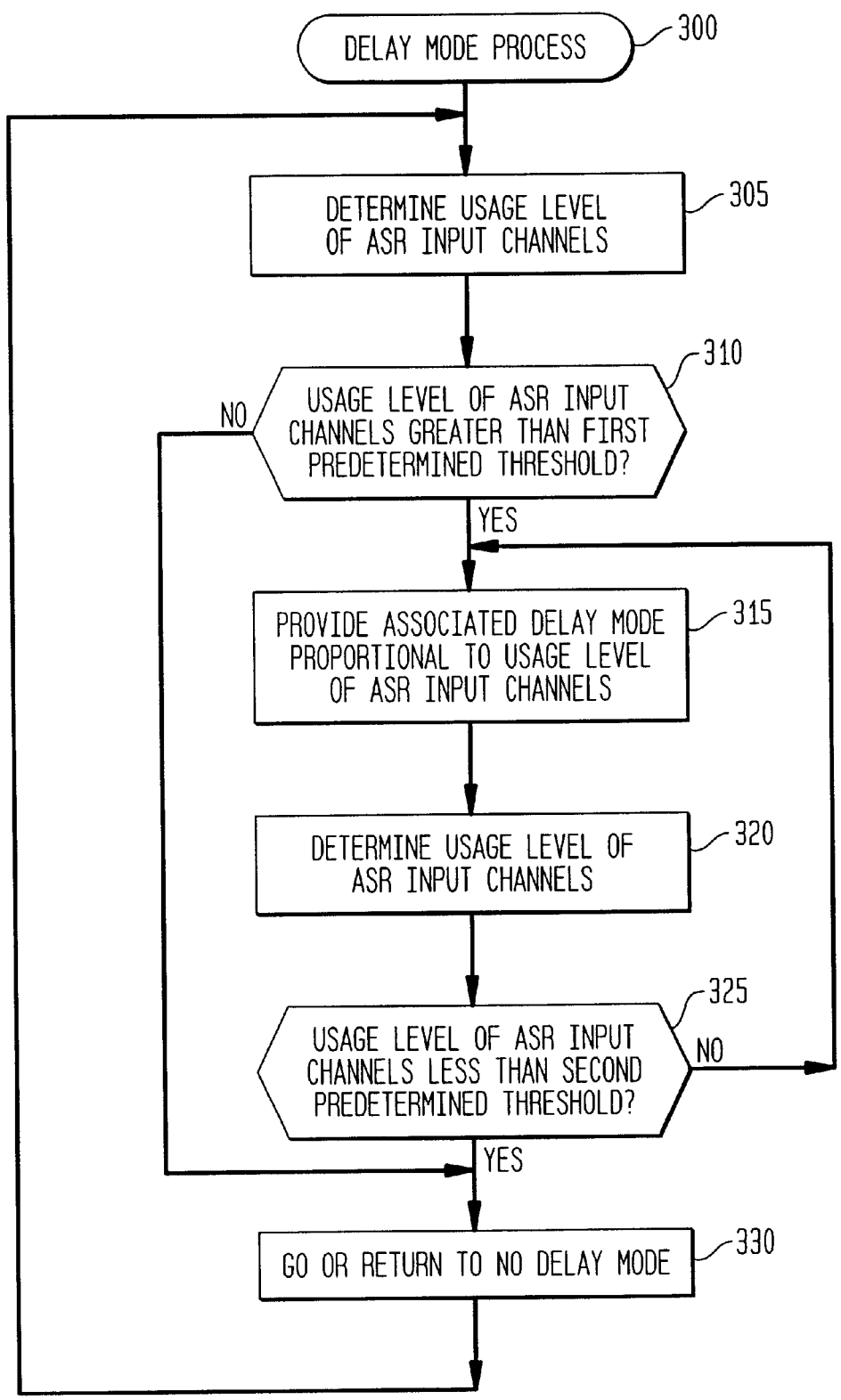

AUTOMATIC SPEECH RECOGNITION CALLER INPUT RATE CONTROL

FIELD OF THE INVENTION

The present invention relates, in general, to automatic speech recognition systems, and more particularly, to an apparatus, method and system for controlling caller input rates for automatic speech recognition systems utilized in interactive information and telecommunication systems.

BACKGROUND OF THE INVENTION

Automatic speech recognition systems are being utilized increasingly for a wide variety of interactive telecommunication and other services. For example, automatic speech recognition systems are utilized to recognize verbal responses to audible prompts in interactive systems such as airline flight information systems, voice dialing telecommunication systems, and electronic mail retrieval (with speech synthesis).

Automatic speech recognition systems, however, have a predetermined and fixed number of input channels, typically 32 to 64 input channels. Current speech recognition systems allocate one such input channel per caller (or other user). As a consequence, once all input channels are in use, additional callers are typically are put on hold until an input channel becomes available. Some systems provide music or announcements to the holding caller, and others provide information to the caller concerning their place in a holding queue. Under conditions of greater congestion, consumers may be informed to call again at another time, and calls may also be dropped or lost altogether.

These holding or dropped call responses to overload conditions, unfortunately, typically create consumer dissatisfaction and irritation. Callers typically dislike and may even resent being put in a holding queue. Correspondingly, service providers would prefer to meet consumer service demands in a timely, user friendly, efficient and cost-effective manner.

As a consequence, a need remains to provide an apparatus, method and system for increased capacity for automatic speech recognition systems, without requiring a corresponding increase in the fixed number of caller input channels. Such an increased capacity should be user transparent, user friendly, and effectively imperceptible to consumers under congestion or overload conditions. Such an increased capacity should also be capable of a cost-effective implementation in existing automatic speech recognition systems, providing increased capacity for any given fixed number of caller input channels.

SUMMARY OF THE INVENTION

The various embodiments of the present invention provide for an increased capacity of an automatic speech recognition (ASR) system primarily by performing two types of functions, a concentrator function and a delay function. The concentrator function allows a greater number of caller input/output (I/O) channels to be in use, by switching only active caller input channels to the ASR input channels for speech recognition (i.e., not providing to or reserving ASR functions for channels which are active only in output (play) modes, in which a caller is listening to a message of the service provider). The delay functionality, for potential overload conditions, is implemented to increase the duration of the output (play) mode, thereby increasing the listening time of the callers, and correspondingly providing more time for the input ASR channels to be utilized to recognize speech input on other calls (and, presumably, to thereby handle a greater call volume). The delay functionality is preferably implemented using one or both of two types of delay, increased message duration for prompts played to the callers, and the insertion of additional periods of silence, at the beginning or during the various messages played to callers.

The preferred interactive communication system having caller input rate control for automatic speech recognition includes, first, a network interface having input channels and output channels; second, an output module for message output on the output channels; third, an automatic speech recognition module having ASR input channels; and a caller input rate control module coupled to the input channels, to the output module and to the ASR input channels. The caller input rate control module includes instructions to determine a usage level of the ASR input channels, and when the usage level of the ASR input channels is greater than a first predetermined threshold, to direct the output module to provide an associated delay mode for a message output on the output channels.

The caller input rate control module provides concentrator functionality by monitoring energy levels of the input channels and storing in a memory buffer all received input from the input channels for a preceding period of time, to form buffered information. When the monitored energy level of a given input channel is greater than a predetermined energy level, the caller input rate control module transmits the buffered information to an ASR input channel and connects that input channel to the ASR input channel for speech recognition.

The caller input rate control module determines the associated delay mode by selecting, individually or in combination, a message duration from a plurality of message durations, and a silent period duration from a plurality of silent period durations, for the message output on the output channel. The associated delay mode may be proportional to the usage level of the ASR input channels, or may correspond to a range or increment of usage levels of the ASR input channels.

Various advantages of the present invention include actually serving a caller by an interactive system, without placing the caller on hold and without loss of the call, while all ASR input channels are busy serving other callers. Second, the various embodiments of the present invention provide for increased ASR system capacity, and provide for more efficient utilization of existing ASR input channels, without requiring a corresponding increase in the given or fixed number of ASR input channels. In addition, by utilizing ASR input channels more efficiently, actual caller waiting time is decreased, and by continuing to serve callers through prompts or messages of longer duration, apparent waiting time is also decreased. Lastly, this increased capacity provided by the present invention is user transparent, user friendly, effectively imperceptible to consumers under congestion or overload conditions, and is also capable of a cost-effective implementation in existing automatic speech recognition systems.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 2 is a flow diagram illustrating a first method embodiment to provide automatic speech recognition caller input rate control in accordance with the present invention.

DETAILED DESCRIPTION OF THE INVENTION

Figure 1:
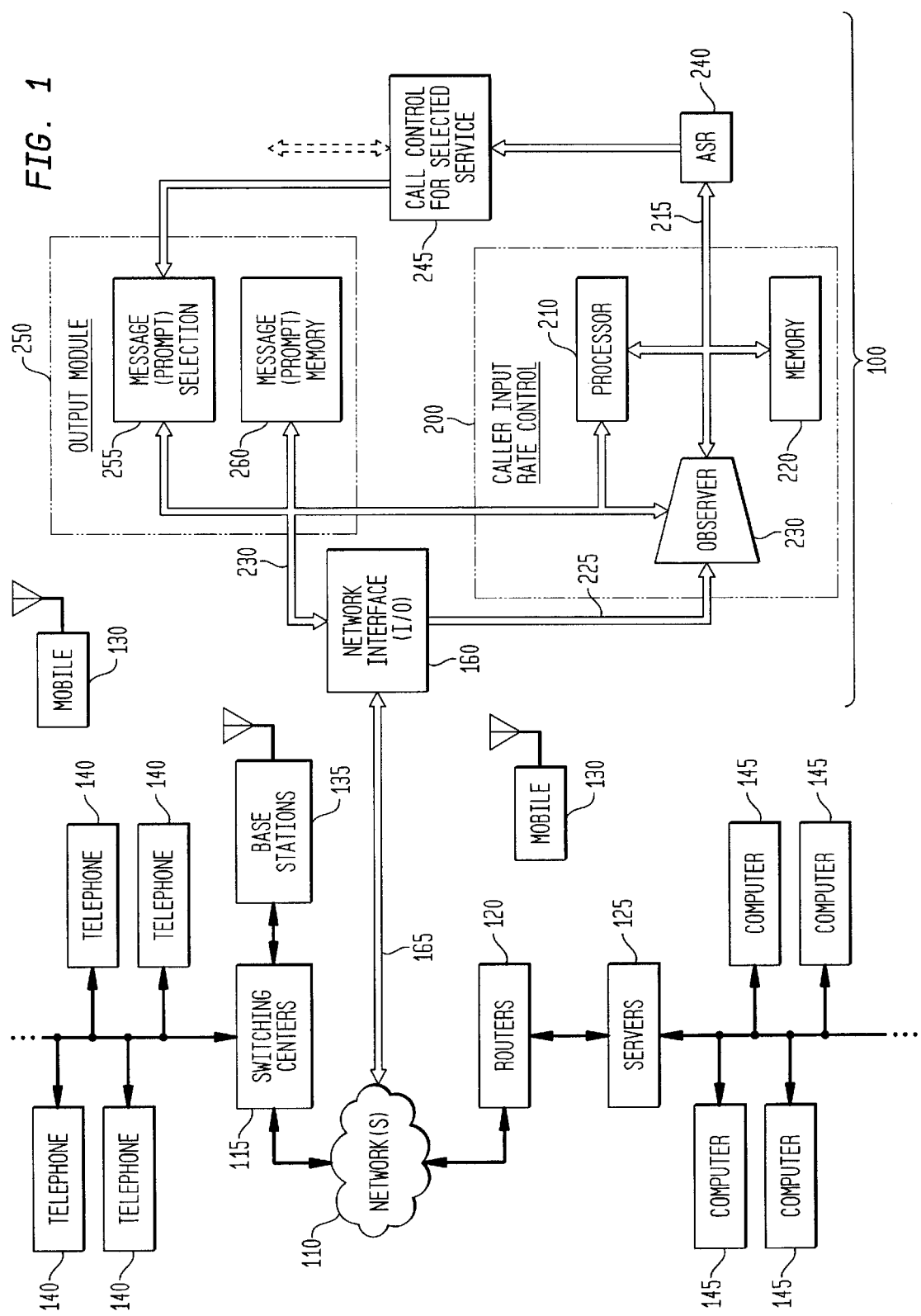
FIG. 1 is a block diagram illustrating system 100 and apparatus 200 embodiments to provide automatic speech

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains to provide for increased capacity for automatic speech recognition ("ASR") systems. In accordance with the present invention, an apparatus, method and system are illustrated which provide for such increased ASR capacity, without requiring a corresponding increase in the given or fixed number of ASR input channels. In addition, this increased capacity provided by the present invention is user transparent, user friendly, and effectively imperceptible to consumers under congestion or overload conditions. The various embodiments of the present invention decrease both the actual and apparent waiting (and/or holding) times of ASR systems, and provide increased user and service provider satisfaction. The increased system capacity provided by the present invention is also capable of a cost-effective implementation in existing automatic speech recognition systems, providing more effective utilization of the given, pre-existing number of ASR caller input channels, and providing such increased system capacity without-requiring any increase in the number of ASR caller input channels and corresponding capital expenditure.

The present invention takes advantage of various empirical observations concerning interactive communication systems that utilize automatic speech recognition. More specifically, in such interactive systems, there are various time periods when a caller is listening to a prompt, message or other information from the service provider; during these time periods, any corresponding ASR input channel is idle, waiting for the caller to respond to the current prompt or message. The present invention utilizes these otherwise idle periods of the ASR to provide speech recognition services to another caller, utilizing the concentrator functionality discussed below. In addition, under periods of increased congestion or overload, the present invention modifies and increases the duration of messages (prompts) played to callers, thereby transparently increasing the listening time of the callers, utilizing the delay functionality discussed below. As a consequence, the various embodiments of the present invention continue to provide service to these callers, while simultaneously providing more time for ASR input channels to be used for other calls, as needed, to diminish any such overload or "bottleneck" situation from such a limited number of ASR input channels.

In the various embodiments of the present invention, prompt or other message duration may be increased, imperceptibly to the caller, both by providing one or more messages of longer duration and by providing increased periods of silence during a message. During this time, an ASR input channel may be utilized for speech recognition on other, active calls, as those callers are verbally responding to their corresponding prompts or other messages. Following a prompt of any duration, when a consumer responds by speaking, an available ASR input channel is then utilized for recognition of that response, and following that response, the ASR input channel is then once again available to recognize the response of another caller.

In accordance with the present invention, therefore, a consumer actually may be served by an interactive system, without being placed on hold and without loss of the call, while all ASR input channels are busy serving other consumers. As a consequence, the various embodiments of the present invention provide for increased ASR system capacity, both providing more efficient utilization of existing ASR input channels and providing for what is known in the art as a "graceful degradation under load". In addition, by utilizing ASR input channels more efficiently, actual caller waiting (or holding) time is decreased, and by continuing to serve callers through prompts or messages of longer duration, apparent waiting time is also decreased.

FIG. 1 is a block diagram illustrating system 100 and apparatus 200 embodiments to provide automatic speech recognition caller input rate control in accordance with the present invention. As illustrated in FIG. 1, the interactive system 100 consists of a network interface 160, an output (or play) module 250, a caller input rate control module or apparatus 200, an automatic speech recognition (ASR) system (component or module) 240, and optionally a call control module 245. The call control module 245 corresponds to a selected service, such as airline flight information, stock quotation services, email retrieval, or voice dialing, to provide selected information (such as flight arrival times or stock market quotations), to aurally transmit email messages, or to perform other selected services (such as telecommunication dialing). The network interface 160 provides for caller input/output ("I/O") for the system 100, such as an output for the playing of messages or prompts from the output module 250 to the caller, and for the input of caller speech into the caller input rate control apparatus 200 and then into the ASR 240.

The network interface 160 is connected to one or more networks 110, such as a public switched telephone network ("PSTN"), an integrated services digital network ("ISDN") or other digital network, and/or a packet-based network such as the Internet. The network 110, in turn, is connected to various systems of switching centers 115 (which may be wireline or wireless), routers 120 and servers 125, which provide for communication with callers or other consumers, via telephones 140 (or other customer premise equipment), mobile units 130 (such as cellular or PCS telephones) (via base stations 135), and computers 145 (or other network access devices). Through any of these various communication media, a caller or other consumer may access the system 100 for interactive ASR services, such as airline flight information, voice dialing, or email retrieval.

Continuing to refer to FIG. 1, the ASR 240 performs speech recognition, such as recognition of a caller's responses to various prompts. The ASR 240 typically has a fixed number of input channels, such as a number "S" of input channels, illustrated as a portion of bus 215 in FIG. 1. In accordance with the present invention, to provide greater system 100 capacity, the network interface 160 preferably has a greater number of I/O channels compared to the ASR 240, such as a number "R" I/O channels (counting each I/O pair as one channel, with R>S (illustrated as a portion of bus 165 of FIG. 1, with (R) input channels continuing to the apparatus 200 via bus 225, and with (R) output channels entering from the output module 250 via bus 230)).

The call control module 245, corresponding to a selected service, provides various services according to input received from the ASR 240. For example, depending upon the recognized speech from ASR 240, the call control module 245 may direct the message selection module 255 (of output module 250) to provide a prompt requesting an airline flight number, and following additional speech recognition, the call control module 245 may access a database (not separately illustrated) for information concerning a particular airline flight, and then direct the output module 250 to provide output (via network interface 160) concerning an arrival or departure time of the corresponding flight.

The caller input rate control apparatus 200, in accordance with the present invention, preferably includes an observer module 230, a processor 210, and a memory 220. The observer module 230 includes an echo canceller and an energy detector. The echo canceller portion of observer module 230 removes any echo of an outgoing message that may be detected at the input of the network interface 160. The energy detection portion of observer module 230 is utilized to detect energy (or, equivalently, power) on each of the plurality of input channels 225 from the network interface 160, indicating that a caller has begun to speak and, therefore, that the corresponding input channel is to be processed for speech recognition by the ASR 240. In the preferred embodiment, the observer module 230 performs energy detection at approximately −30 dBm, for a background noise level of −40 dBm. The memory 220 may be any type of data storage integrated circuit ("IC"), or other circuit or apparatus, such as a various types of random access memory (RAM), DRAM, SRAM or MRAM, and is preferably implemented (at least in part) as a circular buffer. In the preferred embodiment, the memory 220 stores a predetermined amount of recent samples (of speech or silence) from all input channels 225. To avoid any loss of speech from a caller, when the observer module 230 detects energy (input speech) on any given input channel 225, the stored samples (speech) corresponding to that input channel are sent to the ASR 240 for recognition, in addition to any current incoming speech on that input channel. As a consequence, by coupling an input channel from the network interface 160 to the ASR 240 (i.e., connecting an input channel from the network interface 160 to the ASR 240 via observer 230 and memory 220) only when that input channel is active (as indicated by detected energy levels), the observer module 230 and memory 220 (also with processor 210) of apparatus 200 have a concentrator functionality, allowing a greater number (R) of input channels 225 to be utilized compared to the number of ASR 240 input channels (S), thereby also increasing the capacity of the system 100 (without requiring additional ASR 240 input channels).

Continuing to refer to FIG. 1, the processor 210 of apparatus 200 may include a single integrated circuit ("IC"), or may include a plurality of integrated circuits or other components connected, arranged or grouped together, such as microprocessors, digital signal processors ("DSPs"), application specific integrated circuits ("ASICs"), field programmable gate arrays ("FPGAs"), associated memory (such as RAM, DRAM, SRAM, MRAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIGS. 2–4, with associated memory, such as microprocessor memory or additional RAM, DRAM, SRAM, MRAM, ROM, EPROM or $E^2$ PROM. The methodology of the invention, as discussed above and as discussed below with reference to FIGS. 2–4, may be programmed and stored, in the processor 210 with its associated memory (and/or memory 220) and other equivalent components, as a set of program instructions (or equivalent configuration or other program) for subsequent execution when the processor 210 is operative (i.e., powered on and functioning). (Equivalently, when the processor 210 with its associated memory and other equivalent components are implemented in whole or part as FPGAs and/or ASICs, the FPGAs or ASICs also may be designed, configured or hard-wired to implement the methodology of the invention). In the preferred embodiment, the processor 210 also implements and performs the functions of the observer module 230 and the ASR 240.

Figure 3A:
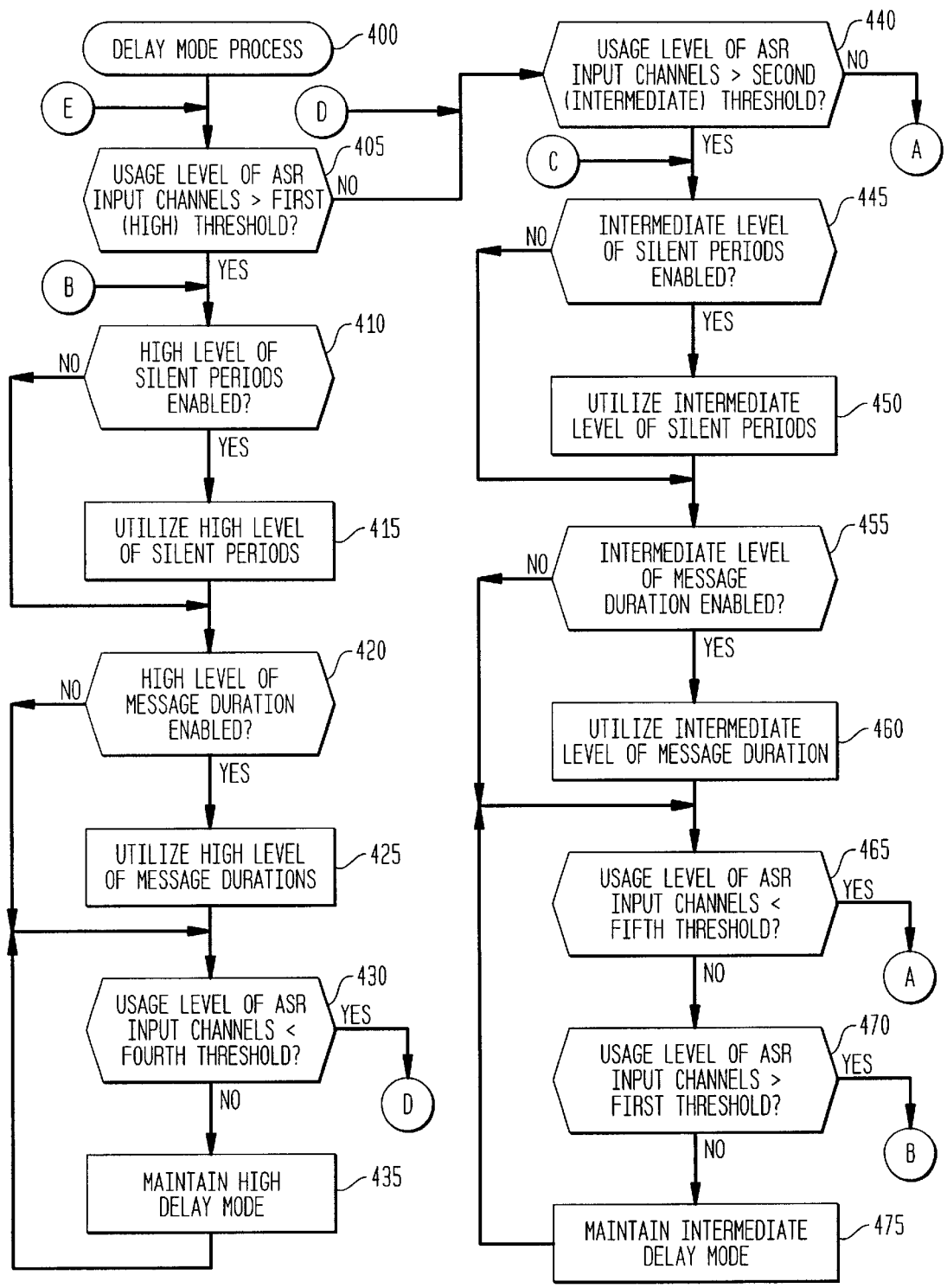
FIG. 3 is a flow diagram illustrating a second method embodiment to provide automatic speech recognition caller input rate control in accordance with the present invention.
Figure 3B:
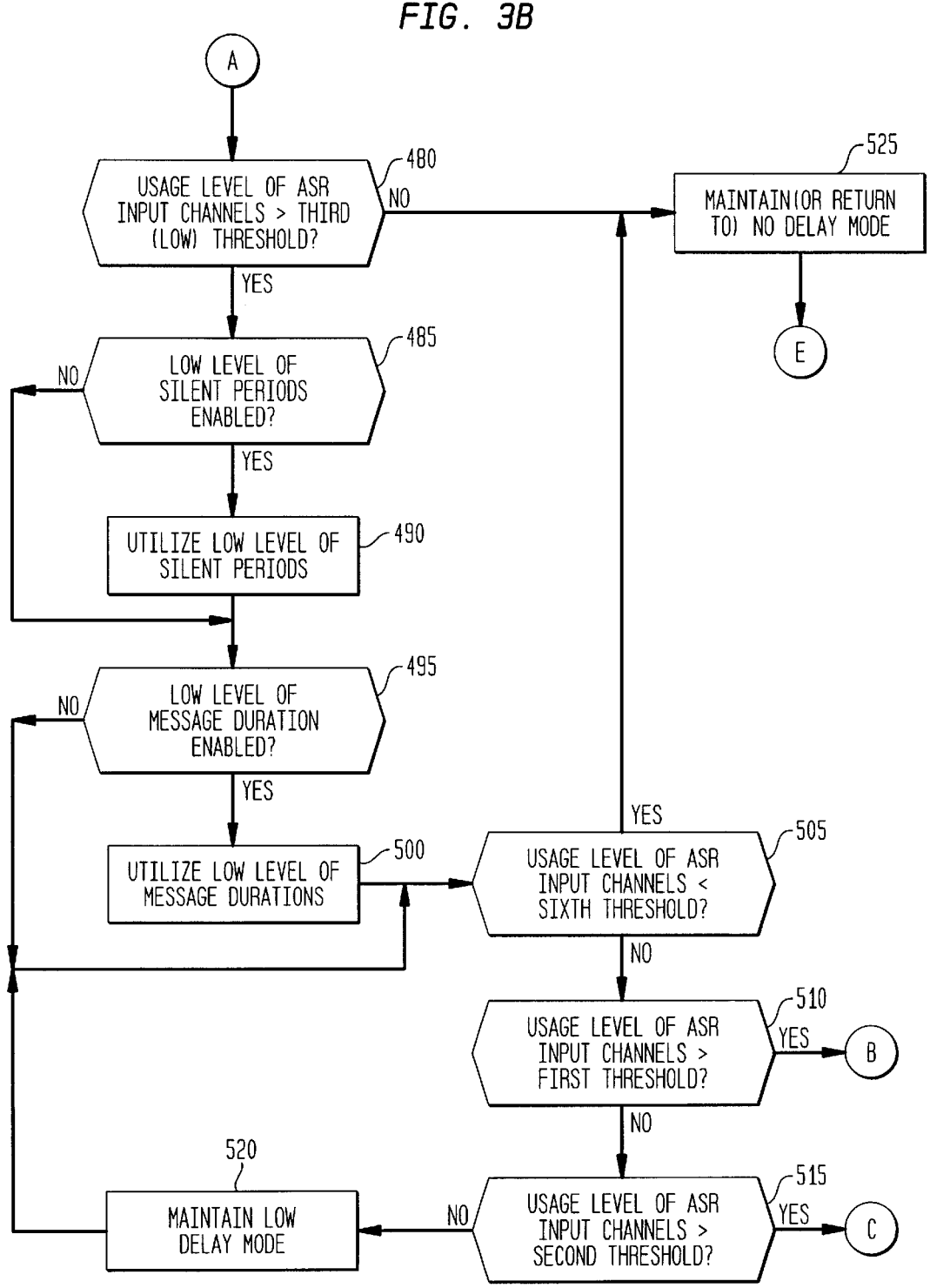
Figure 4:
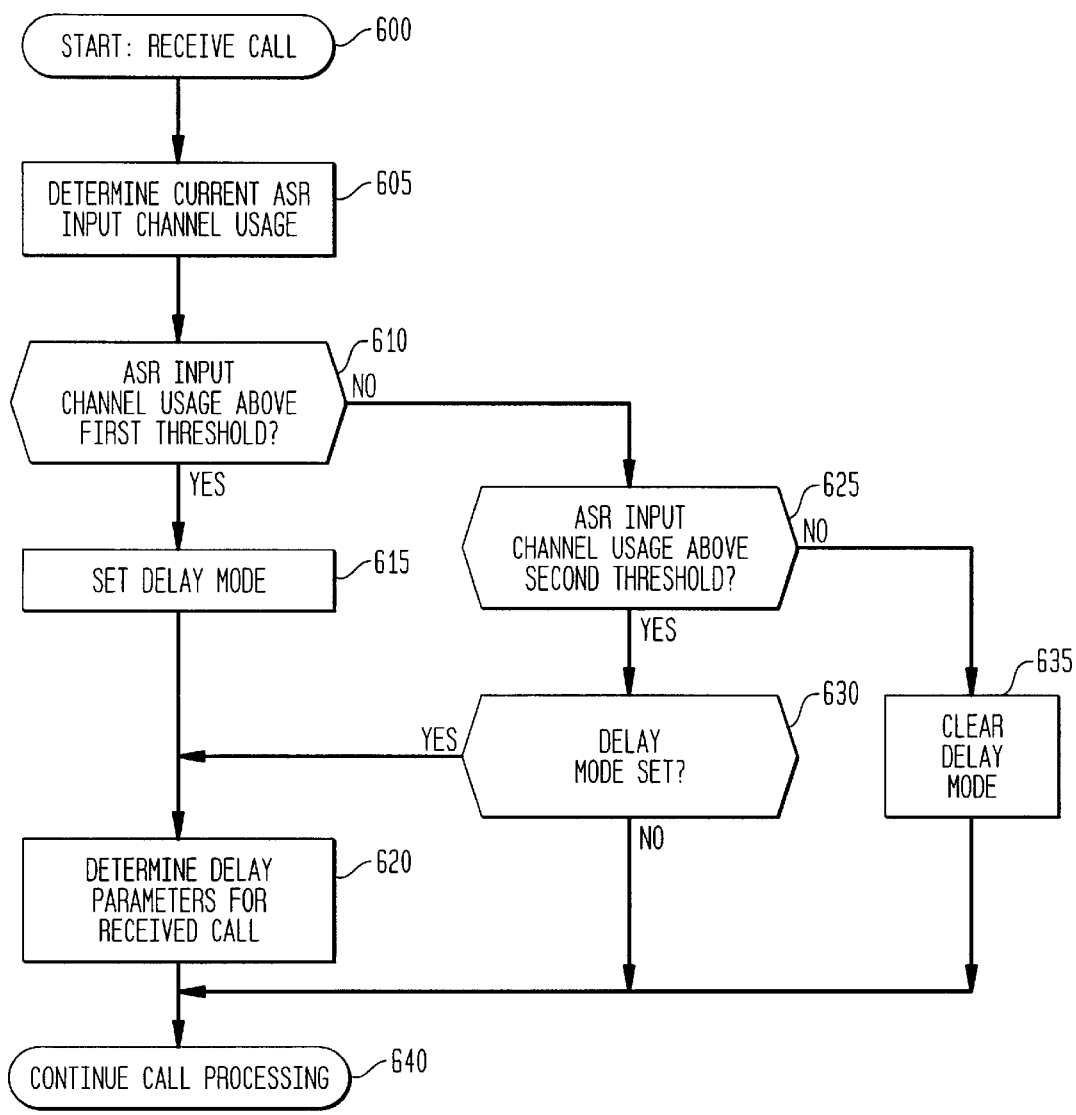
FIG. 4 is a flow diagram illustrating a third method embodiment to provide automatic speech recognition caller input rate control in accordance with the present invention.

In addition to facilitating and increasing the concentrator functionality discussed above, the processor 210 provides the various delay functionalities of the present invention. For example, based upon the degree of utilization of the ASR 240 input channels, the processor 210 may select various delay modes, such as no delay, light (low) delay, intermediate (medium) delay, or heavy (high) delay. As previously indicated, the present invention utilizes two types of delay functionalities, an increased duration of prompts or other messages played to the caller (via output module 250), and an increased duration of silent periods within these prompts or other messages. These two types of delay functionalities may be implemented independently of the other, and may be implemented individually or in combination with each other. As discussed in greater detail below, such delay functionality may be implemented on a continuous basis (FIG. 2) or on an incremental basis (FIG. 3). In addition, such delay functionality also may be implemented as a continuously running process for all calls in progress (FIGS. 2 and 3), or may be implemented with each received call (on a per call basis) (FIG. 4).

One form of delay implemented by the processor 210 in the preferred embodiment is an increase in the duration of silent periods within the messages (or prompts) played by the output module 250. For example, a delay in the beginning of a prompt (i.e., an initial period of silence), on the order of 50 to 2000 ms, is generally imperceptible to the consumer. Other silent periods of varying duration may also be inserted between the spoken words utilized in the messages or prompts. In the preferred embodiment, such additional or increased periods of silence are utilized at the beginning of a message/prompt, and to some degree, during a message/prompt (to the extent that the corresponding message or prompt continues to be perceived as acceptable, rather than perceived as stilted or artificial).

In the preferred embodiment, for optimal consumer transparency, the messages (such as prompts) to be provided to a caller, for the selected service, are pre-recorded in corresponding series having various and different durations, for output (playback) on the output portions of the I/O channels of the network interface 160, via output module 250. For example, in the preferred embodiment, four message series are pre-recorded, corresponding to four associated delay modes (such as no delay, low delay, intermediate delay, and high delay modes): a first series of messages are pre-recorded for situations of no delay; a second series of messages, with each message of slightly longer duration than the corresponding messages of the first series, are pre-recorded for periods of low or light delay; a third series of messages, also with each message of slightly longer duration than the corresponding messages of the second series, are pre-recorded for periods of intermediate or medium delay; and a fourth series of messages, also with each message of slightly longer duration than the corresponding messages of the third series, are pre-recorded for periods of high or heavy delay. These various series of messages are preferably stored in a message or prompt memory 260 of the output module 250.

In the preferred embodiment, the two types of delay functionalities may be implemented, individually or in various combinations, and may be implemented independently of the other. For example, a first delay mode may consist solely of the use of a first (short) silent period at the beginning of a message, with the messages selected from the first series (no additional message duration); a second delay mode may consist solely of the use of messages selected from the second series (low delay messages); a third delay mode may consist of both a short initial silent period and use of messages selected from the second series (low delay messages). A fourth delay mode may consist solely of messages selected from the third series (intermediate delay messages), while a fifth delay mode may consist of a combination of increased silent periods and messages selected from the third series (intermediate delay messages), and so on. The two types of delay functionalities may be selected, in innumerable combinations, to provide any desired level of granularity or continuity for providing delay functionality for caller input rate control in accordance with the present invention.

As mentioned above, based upon the degree of utilization of the ASR 240 input channels, the processor 210 may select various delay modes, such as no delay, low delay, intermediate delay, or high delay. Depending upon the desired embodiment, both the measurement of the utilization of the ASR 240 input channels and the various delay modes may be implemented on a continuous (approximately) basis or an incremental basis. In addition, the selected delay mode may be applicable to all calls in progress or only to a currently received call.

For an approximately continuous example, a service provider may begin to implement various delay modes when ASR 240 input channel utilization is 75% (i.e., 75% of the total number of ASR 240 input channels are in current use), as a threshold. As any additional ASR 240 input channel is utilized, a corresponding associated delay mode is utilized, for all calls in progress. Such an implementation is illustrated below with respect to FIG. 2.

For an incremental example, also applicable to all calls in progress, a service provider also may begin to implement various delay modes depending upon ranges of usage levels of the ASR 240 input channels. For example, when ASR 240 input channel utilization is 75%, as a first threshold, a low delay mode is used (until a next threshold is reached). If and when ASR 240 input channel utilization increases further to a second threshold, such as 83% utilization, the system will begin using an intermediate delay mode, and if and when ASR 240 input channel utilization increases further again to a third threshold, such as 90% utilization, the system will begin using a high delay mode. As a consequence, the use of the various incremental delay modes may correspond to ranges of usage levels of the ASR 240 input channels, such as no delay mode (usage level range of zero to 74%), a low delay mode (usage level range of 75% to 82%), an intermediate delay mode (usage level range of 83% to 89%), and a high delay mode (usage level range of 90% to 100%). Such an implementation is illustrated below with respect to FIG. 3.

Delay modes may also be implemented as a continuously running process, applicable to all calls in progress, as illustrated below with respect to FIGS. 2 and 3. In addition, delay modes may be implemented on a per call basis, as each such call is received, as illustrated below with respect to FIG. 4.

Continuing to refer to FIG. 1, in summary, the caller input rate control apparatus 200 provides for an increased capacity of the ASR system 100 by performing two types of functions, a concentrator function and a delay function. The concentrator function of the apparatus 200 allows a greater number of I/O channels to be in use, by switching only active input channels to the ASR 240 for speech recognition (i.e., not providing to or reserving ASR functions for channels which are active only in output (play) modes, in which a caller is listening to a message of the service provider). The additional delay functionality, for potential overload conditions, is implemented to increase the duration of the output (play) mode, thereby increasing the listening time of the callers, and correspondingly providing more time for the input ASR channels to be utilized to recognize speech input on other calls (and, presumably, to thereby handle a larger burst of call volume).

FIG. 2 is a flow diagram illustrating a first method embodiment to provide automatic speech recognition caller input rate control in accordance with the present invention. The method operates as a continuously running process (or loop) (within processor 210) (step 300). The method (through the processor 210) first determines the usage level of the ASR 240 input channels, such as determining or counting the number of ASR 240 input channels in use, step 305. Next, in step 310, the method determines whether the usage level of the ASR 240 input channels is greater than a first predetermined threshold, such as the 75% threshold discussed above. When the usage level of the ASR 240 input channels is greater than a first predetermined threshold in step 310, the method (through the processor 210) provides a communication delay mode proportional to the usage level of the ASR 240 input channels, step 315. As mentioned above, such a delay mode is (approximately) continuous, utilizing any of various combinations of increased periods of silence and longer duration messages as discussed above. The delay mode is also applied to all calls in progress. Such a delay mode is implemented by directions or commands from the processor 210 to the output module 250.

Continuing to refer to FIG. 2, the method again determines how many ASR input channels are in use, step 320, i.e., determines the current usage level, as various calls may have been terminated and others received. In the preferred embodiment, a delay mode is continued on a hysteretic basis, i.e., until the number of ASR 240 input channels in use has dropped below a second threshold, with the second threshold set at a lower level than the first threshold, such as at 65% utilization when the first threshold is 75% utilization. Accordingly, following the determination of the current usage level of the ASR 240 input channels in step 320, the method determines whether the usage level of the ASR 240 input channels has fallen below (or is less than) a second predetermined threshold, in step 325. When the usage level of the ASR 240 input channels has fallen below (or is less than) the second predetermined threshold in step 325 (or when the number of ASR 240 input channels in use was not greater than the first predetermined threshold in step 310), the method may return to (or stay in) a no delay mode, step 330. When the usage level (such as the number of ASR 240 input channels in current use) has not fallen below (or is not less than) the second predetermined threshold in step 325, the method continues to provide an associated (and, in this case, proportional) delay mode, returning to step 315. Following a return to a no delay mode in step 330, the method returns to step 305, and continues to monitor the usage level of ASR input channels.

FIG. 3 is a flow diagram illustrating a second method embodiment to provide automatic speech recognition caller input rate control in accordance with the present invention. In this second method, four delay states (increments) are utilized, namely, no delay, low delay, intermediate delay, and high delay, based upon various thresholds (and corresponding ranges) of use of the ASR 240 input channels. In addition, hysteretic thresholds are also utilized before transitioning from a higher delay state to a state of lower or lesser delay. Any given or selected delay mode is also applied to all calls in progress. Also in this second method, the determination of the usage level of the ASR 240 input channels is implicit in (or combined with) the various threshold comparisons steps (such as steps 405, 430, 440, 465, 470, 480, 505, 510 and 515, discussed below), and therefore is not illustrated as a separate step. (The determination of the usage level of the ASR 240 input channels may also be accomplished in myriad equivalent ways, as known in the art, such as use of a counter within the processor 210, and does not require any output of an actual numerical result. For example, this determination may result in a percentage or proportion of use, or may result in a count, and so on; as a consequence, this determination step should be broadly construed to be a determination of the current usage or usage level of the ASR 240 input channels, as indicated above with regard to FIG. 2.) As in the method of FIG. 2, the method of FIG. 3 is also implemented in the processor 210, with any delay modes implemented utilizing directions or commands from the processor 210 to the output module 250.

Referring to FIG. 3, the method operates as a continuously running process (or loop) (within processor 210) (step 400). The method determines whether the usage level of the ASR 240 input channels is greater than a first predetermined (high) threshold, such as the 90% threshold discussed above, step 405. When the usage level of the ASR 240 input channels is greater than the first predetermined (high) threshold in step 405, the method provides a high delay mode, proceeding to step 410. When the usage level of the ASR 240 input channels is not greater than the first predetermined (high) threshold in step 405, the method then determines whether the usage level of the ASR 240 input channels is greater than a second predetermined (intermediate level) threshold, such as the 83% threshold discussed above, step 440. When the usage level of the ASR 240 input channels is greater than the second predetermined (intermediate level). threshold in step 440, the method provides an intermediate delay mode, proceeding to step 445. When the usage level of the ASR 240 input channels is not greater than the second predetermined (intermediate level) threshold in step 440, the method then determines whether the usage level of the ASR 240 input channels is greater than a third predetermined (low) threshold, such as the 75% threshold discussed above, step 480. When the usage level of the ASR 240 input channels is greater than the third predetermined (low) threshold in step 480, the method provides a low delay mode, proceeding to step 485. When the usage level of the ASR 240 input channels is not greater than the third predetermined (low) threshold in step 480, the method may maintain (or return to) a no delay mode, step 525, and following step 525, the method continues to monitor the usage levels of ASR 240 input channels, returning to step 405.

Continuing to refer to FIG. 3, when the usage level of the ASR 240 input channels is greater than the first predetermined (high) threshold in step 405, the method provides a high delay mode, proceeding to step 410. In step 410, the method determines whether a first type of delay (silent periods) is enabled for the high delay mode, i.e., whether the use of increased durations of silent periods has been enabled, and if so, the method utilizes a corresponding (high or longest) duration of silent periods in providing the high delay mode, step 415. Following step 415, or when the increased duration of silent periods has not been enabled in step 410, the method proceeds to step 420, and determines whether a second type of delay (message duration) has been enabled for the high delay mode, i.e., whether the use of a series of high duration (comparatively longest) messages or prompts has been enabled. When the use of the series of high duration messages has been enabled in step 420, the method utilizes the series of high duration messages in providing the high delay mode, step 425.

Following step 425, or when the use of the series of high duration messages has not been enabled in step 420, the method proceeds to step 430, and determines whether the usage level of the ASR 240 input channels has fallen below or is less than a fourth predetermined threshold (as calls may have been terminated). In the preferred embodiment, the fourth predetermined threshold is set at a level in between the first and second predetermined thresholds, to provide a level of hysteresis before transitioning to a shorter delay mode. When the usage level of the ASR 240 input channels has not fallen below (or is not less than) the fourth predetermined threshold in step 430, the method maintains the high delay mode, step 435, and returns to step 430, to monitor the usage level of the ASR 240 input channels. When the usage level of the ASR 240 input channels has fallen below (or is less than) the fourth predetermined threshold in step 430, the method proceeds to step 440, to determine whether the method should proceed to an intermediate or low delay mode.

Continuing to refer to FIG. 3, following steps 405 or 430, when the usage level of the ASR 240 input channels is greater than the second predetermined (intermediate level) threshold in step 440 (but not greater than the first predetermined threshold in step 405), the method provides an intermediate delay mode, proceeding to step 445. In step 445, the method determines whether the first type of delay (silent periods) is enabled for the intermediate delay mode, i.e., whether the use of increased durations of silent periods has been enabled, and if so, the method utilizes a corresponding (intermediate) duration of silent periods in providing the intermediate delay mode, step 450. Following step 450, or when the increased duration of silent periods has not been enabled in step 445, the method proceeds to step 455, and determines whether the second type of delay (message duration) has been enabled for the intermediate delay mode, i.e., whether the use of a series of intermediate duration messages or prompts has been enabled. When the use of the series of intermediate duration messages has been enabled in step 455, the method utilizes the series of intermediate duration messages in providing the intermediate delay mode, step 460.

Following step 460, or when the use of the series of intermediate duration messages has not been enabled in step 455, the method proceeds to step 465, and determines whether the usage level of the ASR 240 input channels has fallen below or is less than a fifth predetermined threshold (as calls also may have been terminated). In the preferred embodiment, the fifth predetermined threshold is set at a level in between the second and third predetermined thresholds, also to provide a level of hysteresis before transitioning to the low delay mode. When the usage level of the ASR 240 input channels has fallen below (or is less than) the fifth predetermined threshold in step 465, the method proceeds to step 480, to determine whether the method should proceed to a low delay mode.

When the usage level of the ASR 240 input channels has not fallen below (or is not less than) the fifth predetermined threshold in step 465, the method further determines whether the usage level of the ASR 240 input channels has increased to be greater than the first predetermined threshold (as additional calls may have been received), step 470. When the usage level of the ASR 240 input channels has increased to be greater than the first predetermined threshold in step 470, the method transitions to the high delay mode, returning to step 410. When the usage level of the ASR 240 input channels has not fallen below (or is not less than) the fifth predetermined threshold and has not increased to exceed the first predetermined threshold in steps 465 and 470, the method maintains the intermediate delay mode, step 475, and returns to step 465 to monitor the usage level of the ASR 240 input channels.

Continuing to refer to FIG. 3, following steps 440 or 465, when the usage level of the ASR 240 input channels is greater than the third predetermined (low level) threshold in step 480 (but not greater than the second predetermined threshold in step 440), the method provides a low delay mode, proceeding to step 485. In step 485, the method determines whether the first type of delay (silent periods) is enabled for the low delay mode, i.e., whether the use of increased durations of silent periods has been enabled, and if so, the method utilizes a corresponding (low or lowest) duration of silent periods in providing the low delay mode, step 490. Following step 490, or when the increased duration of silent periods has not been enabled in step 485, the method proceeds to step 495, and determines whether the second type of delay (message duration) has been enabled for the low delay mode, i.e., whether the use of a series of low duration messages or prompts has been enabled. When the use of the series of low duration messages has been enabled in step 495, the method utilizes the series of corresponding (low) duration messages in providing the low delay mode, step 500.

Following step 500, or when the use of the series of low duration messages has not been enabled in step 495, the method proceeds to step 505, and determines whether the usage level of the ASR 240 input channels has fallen below or is less than a sixth predetermined threshold (as calls also may have been terminated). In the preferred embodiment, the sixth predetermined threshold is set at a level below the third predetermined threshold, also to provide a level of hysteresis before transitioning to the no delay mode. When the usage level of the ASR 240 input channels has fallen below (or is less than) the sixth predetermined threshold in step 505, the method proceeds to step 525, to enter the no delay mode.

When the usage level of the ASR 240 input channels has not fallen below (or is not less than) the sixth predetermined threshold in step 505, the method further determines whether the usage level of the ASR 240 input channels has increased to be greater than the first predetermined threshold (as additional calls may have been received), step 510. When the usage level of the ASR 240 input channels has increased to be greater than the first predetermined threshold in step 510, the method transitions to the high delay mode, and proceeds to step 410. When the usage level of the ASR 240 input channels has not fallen below (or is not less than) the sixth predetermined threshold and has not increased to exceed the first predetermined threshold in steps 505 and 510, the method further determines whether the usage level of the ASR 240 input channels has increased to be greater than the second predetermined threshold, step 515. When the usage level of the ASR 240 input channels has increased to be greater than the second predetermined threshold in step 515, the method transitions to the intermediate delay mode, and proceeds to step 445. When the usage level of the ASR 240 input channels has not fallen below (or is not less than) the sixth predetermined threshold (step 505) and has not increased to exceed the first or second predetermined thresholds (steps 510 and 515), the method maintains the low delay mode, step 520, and returns to step 505 to monitor the usage level of the ASR 240 input channels.

FIG. 4 is a flow diagram illustrating a third method embodiment to provide automatic speech recognition caller input rate control in accordance with the present invention. As mentioned above, the delay mode of this embodiment is implemented on a per call basis, as each call is received. Rather than continuously running as a process, the third method begins, start step 600, with the reception of a call by the network interface 160. The method then determines the current usage level of the ASR 240 input channels, step 605. When the usage level of the ASR 240 input channels is above (or greater than) a first threshold, step 610, a delay mode is set, step 615. Next, the method determines delay parameters for the received call, such as determining message duration and/or silent period duration for message output, step 620, and then continues with other processing of the call, step 640.

When the usage level of the ASR 240 input channels is not above (or is not greater than) a first threshold in step 610, to provide hysteresis before returning to a no delay mode, the method determines whether the usage level of the ASR 240 input channels is above (or greater than) a second threshold, step 625. When the ASR 240 input channel usage is above the second threshold in step 625, the method then determines whether the delay mode is set, i.e., whether the delay mode was set on a previous call (indicating that the usage level was previously above the first threshold), step 630. When the delay mode was set in step 630, the method proceeds to step 620, and determines delay parameters for this received call, as discussed above. When the delay mode was not set in step 630, indicating that any previously set delay mode has been cleared (or was never set), the method proceeds to step 640, and continues with other processing of the call. When the ASR 240 input channel usage is not above the second threshold in step 625, the method clears the delay mode, i.e., resets any previously set delay mode, step 635. Following step 635, the method also continues with other processing of the call.

In summary, the various preferred methods provide caller input rate control for an interactive communication system having automatic speech recognition, in which the interactive communication system has a plurality of input channels and a plurality of output channels, and includes an automatic speech recognition component having a plurality of ASR input channels. The methods include, first, determining a usage level of the plurality of ASR input channels; and second, when the usage level of the plurality of ASR input channels is greater than a first predetermined threshold, providing an associated delay mode for a message output on one or more output channels of the plurality of output channels.

The additional concentrator functionality includes monitoring an energy level of an input channel (of the plurality of input channels) to form a monitored energy level; storing in a memory buffer all received (and echo cancelled) input from the input channel for a preceding period of time, to form buffered information; and when the monitored energy level is greater than a predetermined energy level, transmitting the buffered information to an ASR input channel of the plurality of ASR input channels and connecting the input channel to the ASR input channel.

Also in summary, the various associated delay modes may be determined by independently selecting, individually or in combination, a message duration from a plurality of message durations, and a silent period duration from a plurality of silent period durations, for the message output on the output channel. In the preferred embodiments, the various associated delay modes may be proportional to the usage level of the plurality of ASR input channels, or may correspond to ranges of usage levels of the plurality of ASR input channels.

Numerous advantages of the present invention may be apparent from the above discussion. First, a consumer actually may be served by an interactive system, without being placed on hold and without loss of the call, while all ASR input channels are busy serving other consumers. Second, the various embodiments of the present invention provide for increased ASR system capacity, and provide for more efficient utilization of existing ASR input channels, without requiring a corresponding increase in the given or fixed number of ASR input channels. In addition, by utilizing ASR input channels more efficiently, actual caller waiting time is decreased, and by continuing to serve callers through prompts or messages of longer duration, apparent waiting time is also decreased. Lastly, this increased capacity provided by the present invention is user transparent, user friendly, effectively imperceptible to consumers under congestion or overload conditions, and is also capable of a cost-effective implementation in existing automatic speech recognition systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method for providing caller input rate control for an interactive communication system having automatic speech recognition, the interactive communication system having a plurality of input channels and a plurality of output channels, the interactive communication system including an automatic speech recognition component having a plurality of automatic speech recognition input channels, the method comprising:

determining a usage level of the plurality of automatic speech recognition input channels;

when the usage level of the plurality of automatic speech recognition input channels is greater than a first predetermined threshold, providing an associated delay mode for a message output on an output channel of the plurality of output channels;

monitoring an energy level of an input channel of the plurality of input channels to form a monitored energy level;

storing in a memory buffer a plurality of samples, for a preceding period of time, of all received, echo cancelled input from the input channel, to form buffered information; and when the monitored energy level is greater than a predetermined energy level, transmitting the buffered information to an automatic speech recognition input channel of the plurality of automatic speech recognition input channels and coupling the input channel to the automatic speech recognition input channel.

2. A method for providing caller input rate control for an interactive communication system having automatic speech recognition, the interactive communication system having a plurality of input channels and a plurality of output channels, the interactive communication system including an automatic speech recognition component having a plurality of automatic speech recognition input channels, the method comprising:

determining a usage level of the plurality of automatic speech recognition input channels; and when the usage level of the plurality of automatic speech recognition input channels is greater than a first predetermined threshold, providing an associated delay mode for a message output on an output channel of the plurality of output channels, wherein the associated delay mode is determined by independently selecting, individually or in combination, a message duration from a plurality of message durations, and a silent period duration from a plurality of silent period durations, for the message output on the output channel.

3. The method of claim 2, further comprising:

providing the associated delay mode for a plurality of messages output on the plurality of output channels.

4. The method of claim 2, wherein the output channel corresponds to an input channel, of the plurality of input channels, for a currently received call.

5. The method of claim 2, wherein the associated delay mode is proportional to the usage level of the plurality of automatic speech recognition input channels.

6. The method of claim 2, wherein the associated delay mode is an incremental delay mode selected from a plurality of incremental delay modes.

7. The method of claim 2, wherein each associated delay mode of the plurality of associated delay modes corresponds to a predetermined range of usage levels of the plurality of automatic speech recognition input channels.

8. The method of claim 2, wherein the associated delay mode includes an increased duration of the message output on the output channel.

9. The method of claim 2, further comprising:

when the usage level of the plurality of automatic speech recognition input channels is less than a second predetermined threshold, providing a no delay mode for the message output on the output channel.

10. The method of claim 9, wherein the first predetermined threshold is greater than the second predetermined threshold.

11. A method for providing caller input rate control for an interactive communication system having automatic speech recognition, the interactive communication system having a plurality of input channels and a plurality of output channels, the interactive communication system including an automatic speech recognition component having a plurality of automatic speech recognition input channels, the method comprising:

determining a usage level of the plurality of automatic speech recognition input channels; and when the usage level of the plurality of automatic speech recognition input channels is greater than a first predetermined threshold, providing an associated delay mode for a message output on an output channel of the plurality of output channels, wherein the associated delay mode is selected from a plurality of associated delay modes, and wherein the plurality of associated delay modes include, for output on the output channel, a corresponding plurality of message series, the corresponding plurality of message series including a first message series and a second message series, the first message series having a higher incremental delay compared to the second message series wherein each message of the first message series has a longer duration than each corresponding message of the second message series.

12. The method of claim 11, wherein the plurality of associated delay modes include use of a plurality of silent periods, the plurality of silent periods including corresponding silent periods having varying durations.

13. The method of claim 12, wherein the plurality of associated delay modes include use of a silent period, selected from the plurality of silent periods, prior to the output of the message on the output channel.

14. The method of claim 12, wherein the plurality of associated delay modes include use of a silent period, selected from the plurality of silent periods, inserted during the output of the message on the output channel.

15. An interactive communication system having caller input rate control for automatic speech recognition, the system comprising:

a network interface having a plurality of input channels and a plurality of output channels;

an output module for message output on the plurality of output channels;

an automatic speech recognition module, the automatic speech recognition module having a plurality of automatic speech recognition input channels; and a caller input rate control module coupled to the plurality of input channels, to the output module and to the automatic speech recognition input channels, the caller input rate control module including instructions to determine a usage level of the plurality of automatic speech recognition input channels; and when the usage level of the plurality of automatic speech recognition input channels is greater than a first predetermined threshold, to direct the output module to provide an associated delay mode for a message output on an output channel of the plurality of output channels.

16. The system of claim 15, wherein the caller input rate control module includes further instructions to direct the output module to provide the associated delay mode for a plurality of messages output on the plurality of output channels.

17. The system of claim 15, wherein the output channel corresponds to an input channel, of the plurality of input channels, for a currently received call.

18. The system of claim 15, wherein the caller input rate control module includes further instructions to monitor an energy level of an input channel of the plurality of input channels to form a monitored energy level; to store in a memory buffer a plurality of samples, for a preceding period of time, of all received, echo cancelled input from the input channel, to form buffered information; and when the monitored energy level is greater than a predetermined energy level, to transmit the buffered information to an automatic speech recognition input channel of the plurality of automatic speech recognition input channels and to couple the input channel to the automatic speech recognition input channel.

19. The system of claim 15, wherein the caller input rate control module includes further instructions to determine the associated delay mode by selecting, individually or in combination, a message duration from a plurality of message durations, and a silent period duration from a plurality of silent period durations, for the message output on the output channel.

20. The system of claim 15, wherein the caller input rate control module includes further instructions to determine the associated delay mode as proportional to the usage level of the plurality of automatic speech recognition input channels.

21. The system of claim 15, wherein the caller input rate control module includes further instructions to determine the associated delay mode as an incremental delay mode selected from a plurality of incremental delay modes.

22. The system of claim 15, wherein the caller input rate control module includes further instructions to select the associated delay mode from a plurality of associated delay modes, the plurality of associated delay modes including, for output on the output channel, a corresponding plurality of message series, the corresponding plurality of message series including a first message series and a second message series, the first message series having a higher incremental delay compared to the second message series wherein each message of the first message series has a longer duration than each corresponding message of the second message series.

23. The system of claim 22, wherein the plurality of associated delay modes include a plurality of silent periods, the plurality of silent periods including corresponding silent periods having varying durations.

24. The system of claim 23, wherein the caller input rate control module includes further instructions to direct the output module to output a silent period on the output channel, selected from the plurality of silent periods, prior to the output of the message on the output channel.

25. The system of claim 23, wherein the caller input rate control module includes further instructions to direct the output module to insert a silent period, selected from the plurality of silent periods, during the output of the message on the output channel.

26. The system of claim 15, wherein the caller input rate control module includes further instructions to select the associated delay mode from a plurality of associated delay modes, and wherein each associated delay mode of the plurality of associated delay modes corresponds to a predetermined range of usage levels of the plurality of automatic speech recognition input channels.

27. The system of claim 15, wherein the caller input rate control module includes further instructions to direct the output module to include use of a period of silence in the associated delay mode for the message output on the output channel.

28. The system of claim 15, wherein the caller input rate control module includes further instructions to direct the output module to increase a message duration in the associated delay mode for the message output on the output channel.

29. The system of claim 15, wherein the caller input rate control module includes further instructions, when the usage level of the plurality of automatic speech recognition input channels is less than a second predetermined threshold, to direct the output module to provide a no delay mode for the message output on the output channel.

30. The system of claim 29, wherein the first predetermined threshold is greater than the second predetermined threshold.

31. The system of claim 15, further comprising:
a call control module coupled to the output module and to the automatic speech recognition module, the call control module operative to determine message content in response to recognized speech from the automatic speech recognition module.

32. An apparatus for providing caller input rate control for an interactive communication system having automatic speech recognition, the interactive communication system having a plurality of input channels and a plurality of output channels, the interactive communication system including an automatic speech recognition component having a plurality of automatic speech recognition input channels, the interactive communication system including an output module for a message output on the plurality of output channels, the apparatus couplable to the input channels, to the output module and to the automatic speech recognition input channels, the apparatus comprising:
an observer module couplable to the plurality of input channels;
a memory coupled to the observer module and couplable to the plurality of automatic speech recognition input channels; and
a processor coupled to the observer module and to the memory, the processor further couplable to the output module and to the plurality of automatic speech recognition input channels, the processor including instructions to determine a usage level of the plurality of automatic speech recognition input channels, and when the usage level of the plurality of automatic speech recognition input channels is greater than a first predetermined threshold, to direct the output module to provide an associated delay mode for the message output on an output channel of the plurality of output channels.

33. The apparatus of claim 32, wherein the processor includes further instructions to direct the output module to provide the associated delay mode for a plurality of messages output on the plurality of output channels.

34. The apparatus of claim 32, wherein the output channel corresponds to an input channel, of the plurality of input channels, for a currently received call.

35. The apparatus of claim 32, wherein the memory stores a plurality of samples, for a preceding period of time, of all received, echo cancelled input from an input channel of the plurality of input channels, to form buffered information; and wherein the observer module monitors an energy level of the input channel to form a monitored energy level, and when the monitored energy level is greater than a predetermined energy level, directs the memory to transmit the buffered information to an automatic speech recognition input channel of the plurality of automatic speech recognition input channels and couples the input channel to the automatic speech recognition input channel.

36. The apparatus of claim 32, wherein the processor includes further instructions to determine the associated delay mode by selecting, individually or in combination, a message duration from a plurality of message durations, and a silent period duration from a plurality of silent period durations, for the message output on the output channel.

37. The apparatus of claim 32, wherein the processor includes further instructions to determine the associated delay mode as proportional to the usage level of the plurality of automatic speech recognition input channels.

38. The apparatus of claim 32, wherein the processor includes further instructions to determine the associated delay mode as an incremental delay mode selected from a plurality of incremental delay modes.

39. The apparatus of claim 32, wherein the processor includes further instructions to select the associated delay mode from a plurality of associated delay modes, the plurality of associated delay modes including, for output on the output channel, a corresponding plurality of message series, the corresponding plurality of message series including a first message series and a second message series, the first message series having a higher incremental delay compared to the second message series wherein each message of the first message series has a longer duration than each corresponding message of the second message series.

40. The apparatus of claim 39, wherein the plurality of associated delay modes include a plurality of silent periods, the plurality of silent periods including corresponding silent periods having varying durations.

41. The apparatus of claim 40, wherein the processor includes further instructions to direct the output module to output a silent period on the output channel, selected from the plurality of silent periods, prior to the output of the message on the output channel.

42. The apparatus of claim 40, wherein the processor includes further instructions to direct the output module to insert a silent period, selected from the plurality of silent periods, during the output of the message on the output channel.

43. The apparatus of claim 32, wherein the processor includes further instructions to select the associated delay mode from a plurality of associated delay modes, and wherein each associated delay mode of the plurality of associated delay modes corresponds to a predetermined range of usage levels of the plurality of automatic speech recognition input channels.

44. The apparatus of claim 32, wherein the processor includes further instructions to direct the output module to include use of a period of silence in the associated delay mode for the message output on the output channel.

45. The apparatus of claim 32, wherein the processor includes further instructions to direct the output module to increase a message duration in the associated delay mode for the message output on the output channel.

46. The apparatus of claim 32, wherein the processor includes further instructions, when the usage level of the plurality of automatic speech recognition input channels is less than a second predetermined threshold, to direct the output module to provide a no delay mode for the message output on the output channel.

47. The system of claim 46, wherein the first predetermined threshold is greater than the second predetermined threshold.

48. The apparatus of claim 32, wherein the apparatus is embodied within the interactive communication system.

49. An apparatus for providing caller input rate control for an interactive communication system having automatic speech recognition, the interactive communication system having a plurality of input channels and a plurality of output channels, the interactive communication system including an automatic speech recognition component having a plurality of automatic speech recognition input channels, the interactive communication system including an output module for a message output on the plurality of output channels, the apparatus comprising:

an observer module couplable to the plurality of input channels, the observer module operative to provide echo cancellation and to monitor an energy level of an input channel of the plurality of input channels to form a monitored energy level, and when the monitored energy level is greater than a predetermined energy level, to connect the input channel to an automatic speech recognition input channel of the plurality of automatic speech recognition input channels;

a memory coupled to the observer module and couplable to the plurality of automatic speech recognition input channels, the memory operative to store a plurality of samples, for a preceding period of time, of all received, echo cancelled input from the input channel to form buffered information and to transmit the buffered information to the automatic speech recognition input channel; and a processor coupled to the observer module and to the memory, the processor further couplable to the output module and to the plurality of automatic speech recognition input channels, the processor including instructions to determine a usage level of the plurality of automatic speech recognition input channels, and when the usage level of the plurality of automatic speech recognition input channels is greater than a first predetermined threshold, to direct the output module to provide an associated delay mode for a plurality of messages output on the plurality of output channels; and wherein the processor includes further instructions, when the usage level of the plurality of automatic speech recognition input channels is less than a second predetermined threshold, to direct the output module to provide a no delay mode for the plurality of messages output on the plurality of output channels.

50. The apparatus of claim 49, wherein the processor includes further instructions to determine the associated delay mode by selecting, individually or in combination, a message duration from a plurality of message durations, and a silent period duration from a plurality of silent period durations, for the plurality of messages output on the plurality of output channels.

51. The apparatus of claim 49, wherein the processor includes further instructions to select the associated delay mode from a plurality of associated delay modes, the plurality of associated delay modes including a plurality of continuous delay modes proportional to the usage level of the plurality of automatic speech recognition input channels and including a plurality of incremental delay modes proportional to corresponding ranges of usage levels of the plurality of automatic speech recognition input channels, the plurality of continuous delay modes and the plurality of incremental delay modes comprised of selections, individually or in combination, from a plurality of silent periods having variable durations and from a plurality of message series having variable durations.

* * * * *